United States Patent
Morefield

(10) Patent No.: US 6,536,983 B1
(45) Date of Patent: Mar. 25, 2003

(54) CRIMP JOINT FOR PRESSURE CONTAINING GAS AND FLUID DISTRIBUTION DEVICES

(75) Inventor: Patrick N. Morefield, Burlington, NC (US)

(73) Assignee: Engineered Controls International Inc., Elon College, NC (US)

(*) Notice: Subject to any disclaimer, the term of this patent is extended or adjusted under 35 U.S.C. 154(b) by 0 days.

(21) Appl. No.: 09/488,169

(22) Filed: Jan. 20, 2000

(51) Int. Cl.⁷ .................................................. F16B 3/28
(52) U.S. Cl. .................... 403/278; 403/212; 403/279; 403/282; 285/202; 285/382
(58) Field of Search ................... 403/278, 274, 403/212, 279, 282, 338; 285/202, 382

(56) References Cited

U.S. PATENT DOCUMENTS

| | | | |
|---|---|---|---|
| 1,332,686 A | 3/1920 | Reynolds | 285/204 |
| 1,591,183 A | 7/1926 | Reynolds | 285/202 |
| 1,609,968 A | 12/1926 | Schroeder | 16/2.1 |
| 1,720,807 A | 7/1929 | Wackman | 285/202 |
| 2,131,978 A | 10/1938 | Schwartz | 29/148.2 |
| 2,133,852 A | 10/1938 | Dillhoefer | 285/49 |
| 2,260,149 A | 10/1941 | Meek | 29/148.2 |
| 2,327,656 A | 8/1943 | Meek | 285/49 |
| 3,958,719 A * | 5/1976 | Ward | 220/288 |
| 4,135,639 A | 1/1979 | Dillon et al. | 220/288 |
| 4,450,081 A * | 5/1984 | Anderson et al. | 210/445 |
| 4,677,730 A | 7/1987 | Mineo et al. | 29/512 |
| 4,932,114 A * | 6/1990 | Morse et al. | 29/443 |
| 5,237,734 A * | 8/1993 | Polon | 29/513 |
| 5,492,376 A * | 2/1996 | Usui et al. | 285/382 |
| 5,743,571 A * | 4/1998 | Gaitros et al. | 285/39 |
| 5,769,465 A * | 6/1998 | Schultz et al. | 285/328 |

* cited by examiner

Primary Examiner—Lynne H. Browne
Assistant Examiner—John B. Walsh
(74) Attorney, Agent, or Firm—McAndrews, Held & Malloy, Ltd.

(57) ABSTRACT

An improved crimp joint for joining components of gas or fluid distribution systems is disclosed. The joint is particularly suited for use with components made from low ductility materials including die cast metals. The joint comprises a flange formed by a first joined component and a second component that defines a second mating surface and a lip that is configured to closely surround at least a portion of the flange when the flange is positioned adjacent to the second mating surface. The joint is formed by deforming the lip to overlie the flange, capturing the flange between the deformed lip and the second mating surface. The flange includes a bead formed near the periphery of the flange on a surface against which the lip is deformed to abut to form the crimp joint. The bead is sized to deform and engage the lip thereby increasing the strength of the crimp joint.

6 Claims, 5 Drawing Sheets

CRIMP JOINT FOR PRESSURE CONTAINING GAS AND FLUID DISTRIBUTION DEVICES

FIELD OF THE INVENTION

This invention relates to an improved connection between pressure containing components of a fluid or gas system device, and in particular to a crimp joint that joins and secures components to each other and that has increased strength compared to prior crimp joints. The crimp joint comprises a flange extending from a first component and a cavity of a second component that accepts and closely surrounds the flange. The flange is defined by a flange mating surface and an engaging surface that face in generally opposite directions and extend from the first component to an outer flange edge. The cavity of the second component is defined by a second mating surface that is configured to conform to the flange mating surface and a lip that extends from the second mating surface to closely surround the outer flange edge. The lip extends from the second mating surface a distance that is greater than the width of the flange between the flange mating surface and the engaging surface. The crimp joint is formed by first positioning the flange within the cavity with the flange mating surface adjacent to the second mating surface. The lip is deformed toward the flange to overlie and conform to the engaging surface capturing the flange between the second mating surface and the deformed lip overlying the flange. The engaging surface of the flange is configured to abut the lip to prevent deformation of the lip to an extent that would weaken the lip and is configured to deform and to deform and engage the lip to provide a crimped joint of increased strength compared to prior crimp joints.

BACKGROUND OF THE INVENTION

Fluids and gas are distributed through systems of pipes or tubing that include pumps, valves, regulators, and other devices that control and direct movement of a fluid or gas through the system. In addition to performing their specific function within the distribution system, these devices must contain the fluid or gas within the device without leakage.

Devices used in fluid and gas distribution systems have varying degrees of mechanical complexity that depend on the system within which they are used and on their functions within the system. Most such components have internal components that cannot be reasonably assembled within the small space that they occupy in their assembled and functioning configuration. Manufacturing considerations require that the exterior of these devices be formed from separate, outer components that are joined to each other after the internal components are assembled and mounted to these outer components. The outer components of such devices generally form a barrier between the fluid or gas with in the system and the environment surrounding the system. The joints between outer components must be both strong and leak-proof.

One measure of the strength of the joint between outer components of a fluid or gas distribution system device is the amount of pressure within the device that can be contained without either leaking through the joint or failure of the joint. In addition to securing outer components to each other in a leak-proof manner, the joint between outer components may also be required to engage and support internal components of the device.

Different joints have been used to join outer components of fluid or gas distribution system devices depending on the requirements of the joint. Bolted joints are commonly used to provide a joint that has high strength and is leak-proof. Bolted joints are typically formed by two flanges, each joined component forming one of the flanges, that are configured to conform to each other along mating surfaces that are positioned adjacent to each other. Both flanges have holes extending from the mating surfaces that are aligned with a hole of the adjacent flange. One of several conventional threaded fastener configurations may be used to secure the flanges to each other. A bolt may extend through aligned holes of both flanges from a surface of one flange opposite the mating surface to position a bolt head abutting that opposite surface. The bolt may extend through the other flange to engage a nut that is threaded onto the bolt to abut a surface of the other flange opposite the mating surface. Alternatively, the hole of the second flange may be threaded to engage the bolt eliminating the need for a nut to engage the bolt. A threaded stud may be used in place of a bolt either to engage threads of one flange or to extend through both flanges and have nuts threaded onto the portions of the threaded stud that extend beyond the flange.

Bolted joints can provide a wide range of joint strengths depending on the size and separation of the bolts. A disadvantage of bolted joints is that they require several manufacturing operations, which can include machining the mating surfaces, drilling holes, and threading holes. Bolted joints also require bolts or threaded studs and nuts, and require assembly and tightening of the bolts to secure the components to each other. These operations are time consuming making bolted joints relatively expensive.

A less expensive joint that has been used to join components of fluid and gas distribution systems is a crimp joint. Crimp joints in the prior art have conventionally been formed by a uniform thickness flange extending generally perpendicularly from the outer surface of a first component and a lip of a second component that is deformed to overlie the flange and secure it against a mating surface of the second component. These prior art crimp joints are less expensive to manufacture and assemble than bolted joints. There are several disadvantages of prior art crimp joints that have limited their use.

One significant problem associated with such prior art crimp joints relates to the deformation of the lip that is required to capture the flange. Where the flange is perpendicular to the surrounding lip, the surrounding lip must be deformed so that a portion of the lip is perpendicular to its original configuration. This requires a large deformation of the surrounding lip and therefor requires that the lip be made of a material that will sustain such large deformation without cracking, becoming brittle, or otherwise failing or becoming susceptible to later failure. Materials that can be so deformed, such as steel, are relatively expensive and therefor increase the cost of the device.

Less expensive material has been used to form components of a fluid or gas system device that have a crimp joint where, rather than having a flange that is perpendicular to a surrounding lip, a flange is formed to have an upper surface opposite the flange mating surface that extends from an outer edge of the flange and away from the flange mating surface so that the flange upper surface forms an angle with the lip that is less than a perpendicular angle. The surrounding lip of the second component then is deformed over the edge of the flange to abut upper surface by an angle that is less than ninety degrees to form the crimp joint. Because less deformation of the lip is required to form the joint than perpendicular flanges, the material from which the surrounding lip is made need not be capable of sustaining high strain and therefor can be a less expensive material compared to material required for larger deformation. A recognized disadvantage of such joints is that they are less strong than a joint formed by deforming the surrounding lip to an angle of ninety degrees.

A need remains for a crimp joint that can be formed by components made of materials that cannot sustain high strain and that provides increased strength compared to prior crimp formed from components made of such materials.

SUMMARY OF THE INVENTION

The present invention overcomes problems and disadvantages of prior crimp joints used to join components of fluid or gas distribution system devices. The joint according to the present invention comprises a flange that extends from a first component to a flange edge and a second component that defines a cavity to accept the flange. The cavity is defined by a second mating surface and a surrounding lip that extends from the second mating surface and is configured to closely surround the flange edge. The flange includes a flange mating surface that conforms to the second mating surface, and an engaging surface adjacent to the flange edge that preferably extends at least partially along the surrounding wall to form an angle with the surrounding wall that is less than ninety degrees when the flange mating surface is adjacent to the second mating surface. The engaging surface includes a bead that is formed to extend outwardly from the engaging surface at a location that is sufficiently near the flange edge that the surrounding lip will overlie the bead when the lip is deformed to overlie the engaging surface.

The crimped joint is formed by placing the flange of the first component in the cavity of the second component with the flange mating surface adjacent to the second mating surface of the second component. The surrounding lip is closely adjacent to the flange edge and is deformed toward the engaging surface of the flange until it overlies the engaging surface and conforms to the surface including the bead.

Accordingly, an object of the present invention is to provide a crimp joint that is less costly than prior crimp joints that support significant loads.

Another object of the present invention is to provide a crimp joint that does not require components of the joint to be manufactured from materials that can sustain high strains.

Yet another object of the present invention is to provide a crimp joint that provides greater strength than prior crimp joints formed by component made of materials that will not sustain high strains.

These and other objects and advantages of the present invention will be understood from the following description and drawings of an embodiment of a crimp joint according to the present invention.

DETAILED DESCRIPTION OF THE PREFERRED EMBODIMENT

Figure 1:
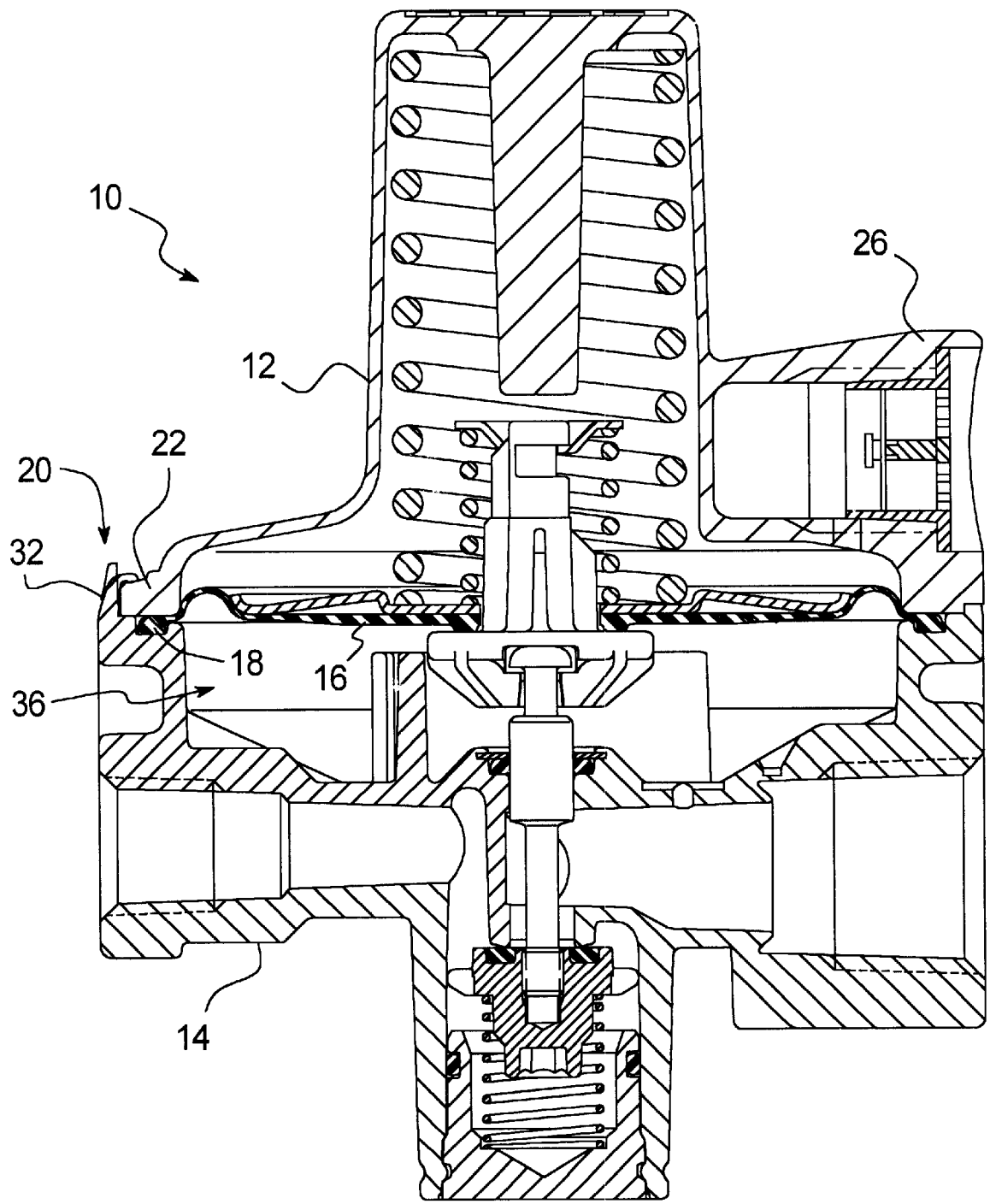
FIG. 1 is a sectional view of a gas regulator having the bonnet and body joined by a crimp joint according to the present invention.

FIG. 1 is a sectional view of an LP (liquefied petroleum) gas regulator 10 having a bonnet 12 and a body 14 joined by a crimp joint 20 according to the present invention. The bonnet 12 and the body 14 are die cast from a low ductility zinc alloy.

Figure 2:
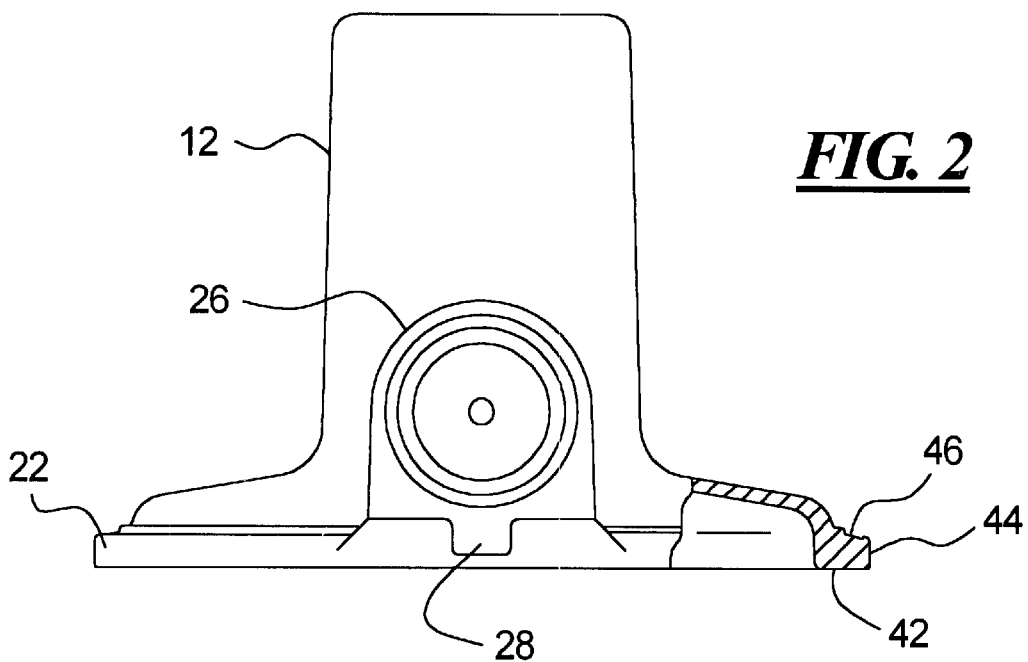
FIG. 2 is a partially cut away side elevation view of the bonnet of the gas regulator of FIG. 1.
Figure 3:
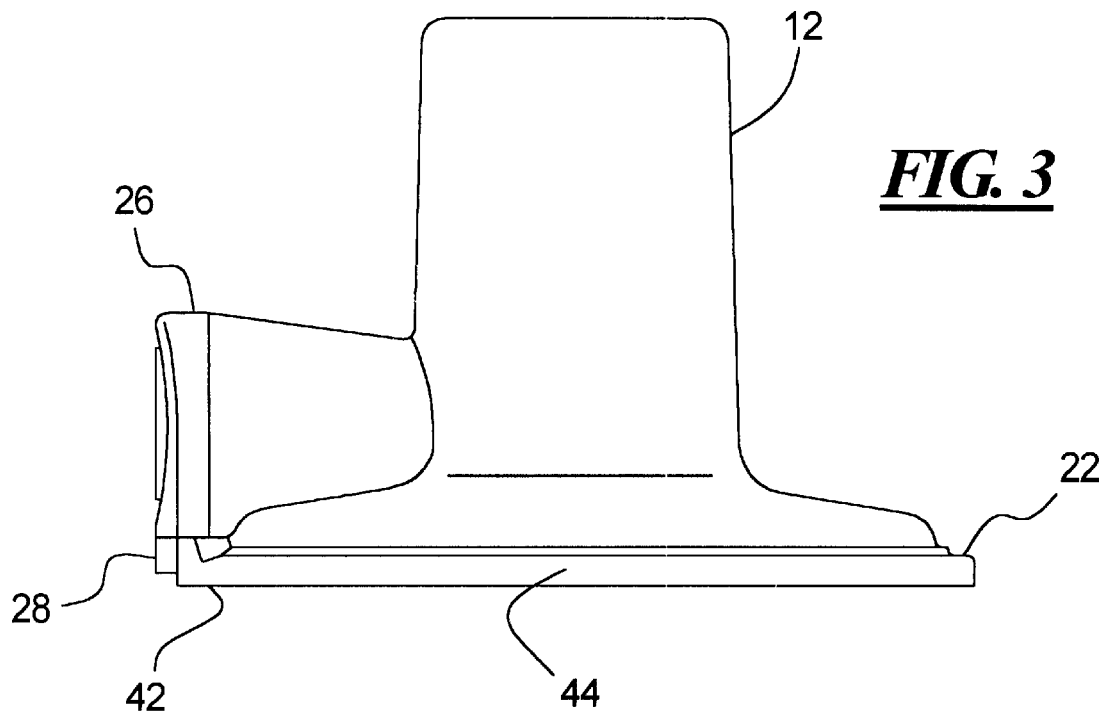
FIG. 3 is a front elevation view of the bonnet of the gas regulator of FIG. 1.

As best shown by FIGS. 2 and 3, the bonnet 12 includes a flange 22 that extends outwardly from the bonnet 12 around its periphery except at the location that vent housing 26 extends to the periphery of the bonnet 12. The vent housing 26 includes a boss 28 that extends toward a flange material surface 42 and in an outward direction from the bonnet 12 toward a flange edge 44 from the vent housing 26.

Figure 4:
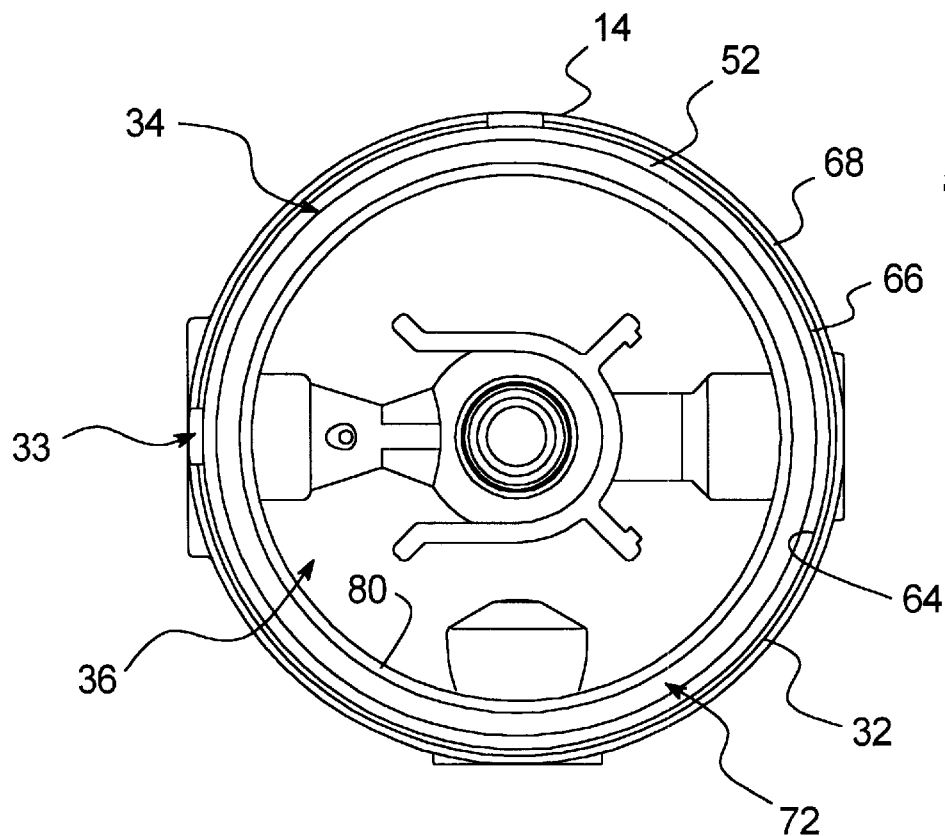
FIG. 4 is a top view of the body of the gas regulator of FIG. 1.
Figure 5:
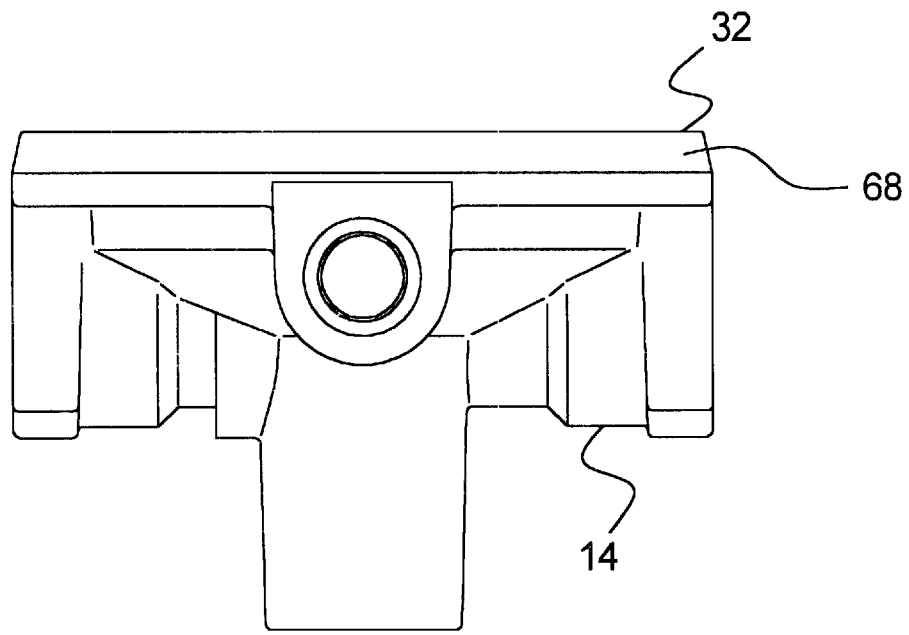
FIG. 5 is a side elevation view of the body of the gas regulator of FIG. 1.

As shown by FIGS. 1, 4, and 5, the body 14 includes a lip 32 that extends from the body 14. The lip 32 is illustrated in FIGS. 4 and 5 and in phantom in FIG. 1 in its configuration prior to deformation to form the crimp joint 20. As shown by FIG. 1, this original configuration of lip 32 partially defines a cavity 34 within which the flange 22 of the bonnet 12 to can be positioned. The lip 32 closely surrounds at least a portion of the flange 22 to position the bonnet 12 with respect to the body 14. As shown by FIG. 4, the lip 32 does not extend continuously around the periphery of the body 14, but rather defines an opening 33 that is sized to accept the boss 28 of the vent housing 26. The lip 32 thereby both locates the bonnet 12 within the cavity 34 and at a desired orientation with respect to the body 14.

Figure 6:
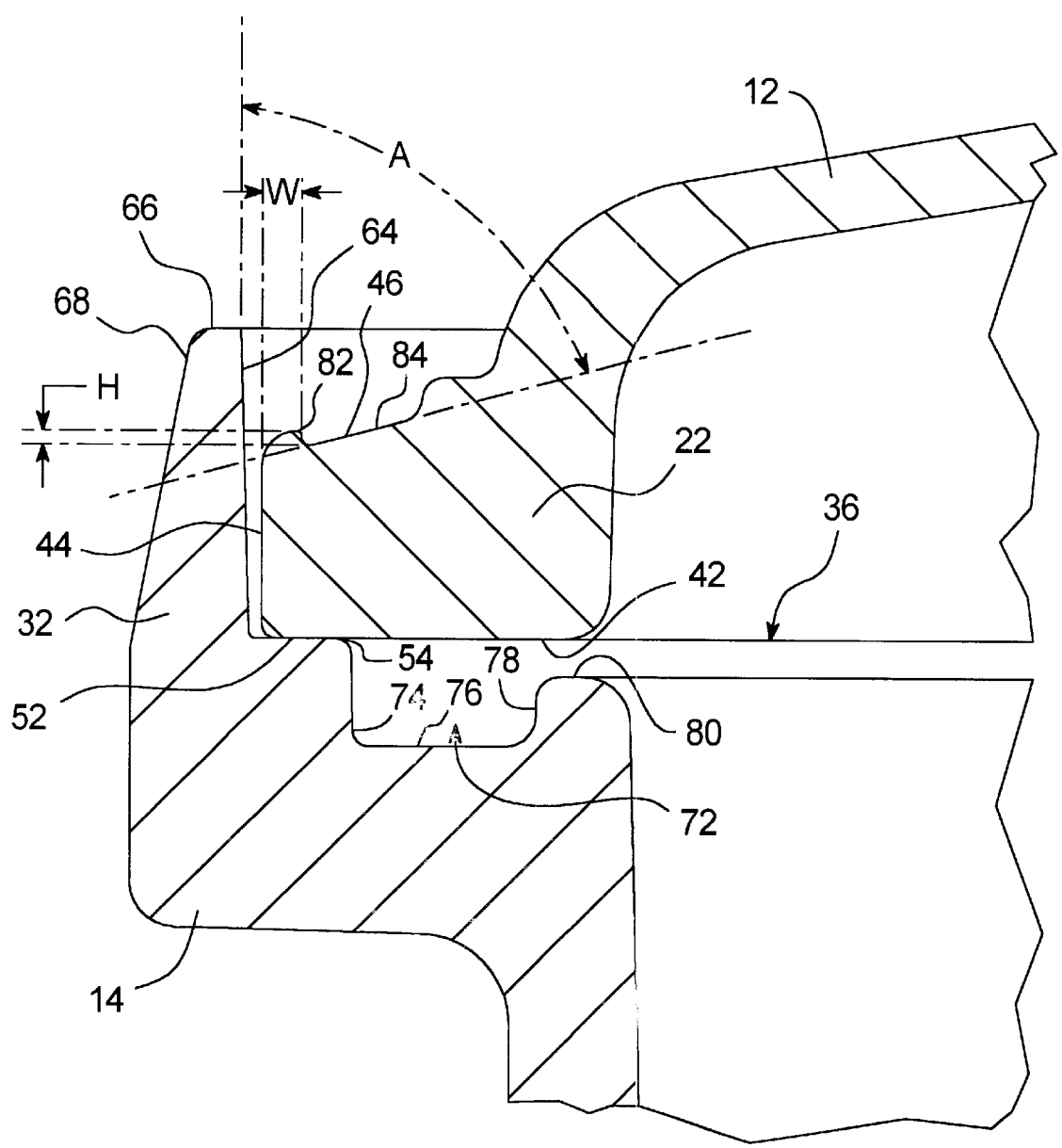
FIG. 6 is a sectional view of regions of the bonnet and body of the gas regulator depicted by FIG. 1 that form the crimp joint according to the present invention prior to deforming of the body to form the crimp joint.

FIGS. 2 and 6 show a cross-sectional view of the flange 22 and a section of the body 14 adjacent to the flange 22. The flange 22 defines the flange mating surface 42 that faces outwardly in a first direction from the bonnet 12. The flange edge 44 is adjacent to the outer extent of the flange mating surface 42. An engaging surface 46 extends from the edge 44 inwardly toward the bonnet 12 overlying the flange mating surface 42. The flange 22 of the described embodiment is circular having an outside diameter at the flange edge 44 of 3.25 inches.

Figure 7:
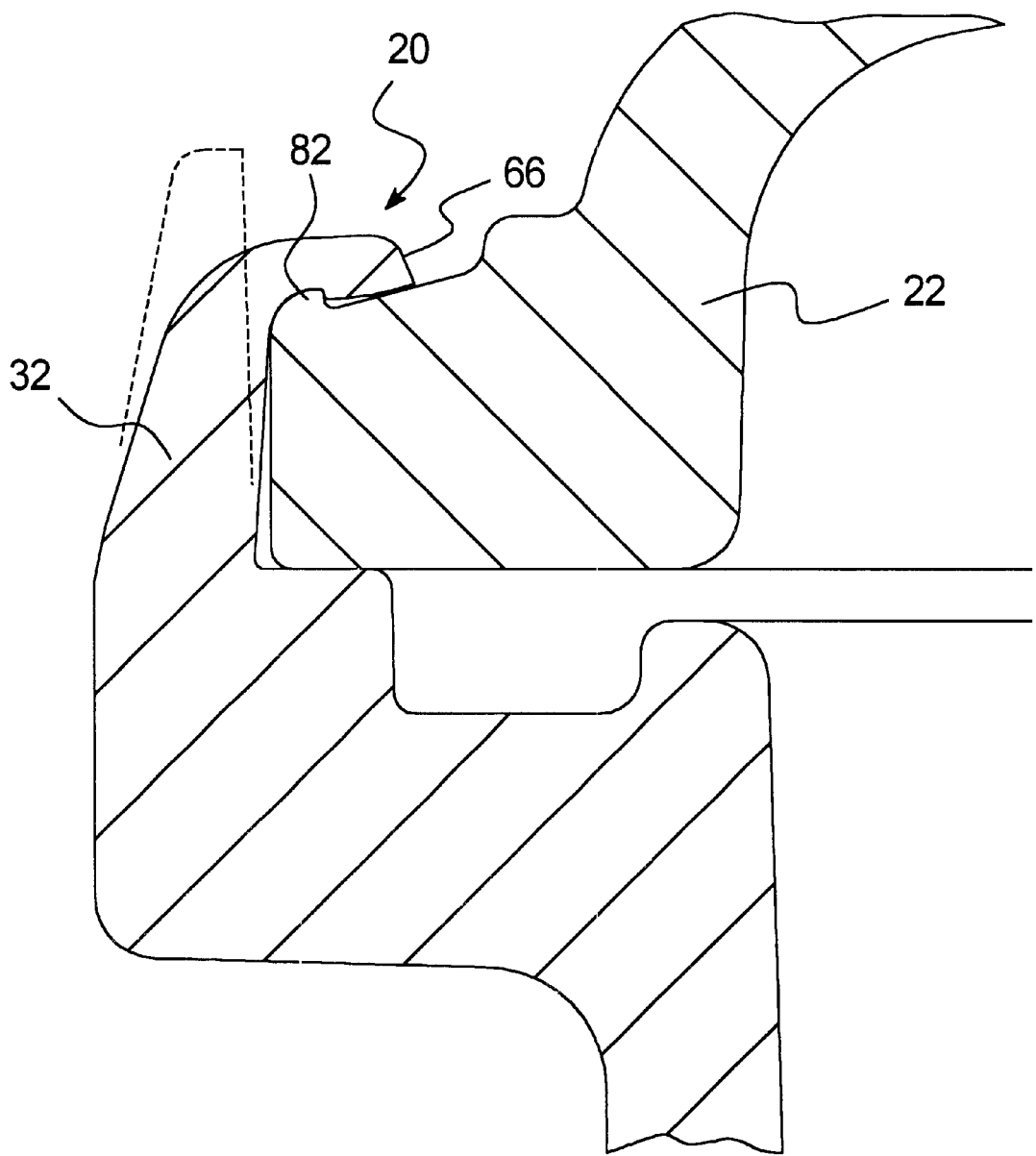
FIG. 7 is a sectional view of crimp joint regions of the bonnet and body of the gas regulator depicted by FIG. 1 after the body is deformed to form a crimp joint between the bonnet and body according to the present invention.

As best shown by FIGS. 1 and 4, the body 14 defines a cavity 34 into which the flange 22 of the bonnet 12 is positioned to locate the bonnet 12 with respect to the body 14. As shown by FIGS. 4 and 6, the cavity 34 defined by the body 14 is bounded in part by the second mating surface 52. The second mating surface 52 faces outwardly from the body 14 and defines a continuous path around the body 14 adjacent to an interior 36 of the body 14 in which various components of the gas regulator 10 are contained. The second mating surface 52 is configured to conform to at least a portion of the flange mating surface 42, as shown by FIGS. 1, 6, and 7. As best shown by FIGS. 1 and 6, the lip 32 extends outwardly from a location adjacent to the second mating surface 52 in a direction that is at least in part perpendicular to the second mating surface 52. As best shown by FIG. 6, the lip 32 is defined between an inwardly facing inner surface 64 that extends from the second mating surface 52 to an edge 66 and an outwardly facing outer surface 68 that extends toward the body 14 from the edge 66.

The inner surface 64 and the second mating surface 52 define boundaries of the cavity 34 within which the flange 22 of the bonnet 12 is positioned, as shown by FIG. 1. As also shown by FIG. 1, the lip 32 is sized to extend from the second mating surface 52 in is original configuration a distance that is sufficient to extend beyond the flange 22 when the flange mating surface 42 of the flange 22 is adjacent to the second mating surface 52.

As best shown by FIGS. 4 and 6, the body 14 defines a recess 72 adjacent to the second mating surface 52 and opposite the lip 32. The recess 72 extends continuously along the second mating surface 52 and into the body 14 from the second mating surface 52. As shown by FIG. 6, the recess 72 is adjacent to a portion of the mating surface 42 of the flange 22 when the flange mating surface 42 overlies the second mating surface 52.

The recess 72 is defined by an outer recess wall 74 that extends into the body 14 from an inner edge 54 of the second mating surface 52. A lower surface 76 extends from the farthest extent of the wall 74 away from the second mating surface 52 to form a gap between the flange mating surface 42 and the lower surface 76. The lower surface 76 extends from the outer recess wall 74 to meet an inner recess wall 78. The inner recess wall 78 extends toward the flange mating surface 42 of the flange 22 to meet an upper surface 80. The upper surface 80 that extends away from the second mating surface 52 to form a gap between the upper surface 80 and the flange mating surface 42 that is smaller than the gap between the lower surface 76 and the flange mating surface 42.

A reinforced elastomer diaphragm 16 that is part of the regulator mechanism is positioned between the flange 22 and the body 14 and is held in place between the flange 22 and the body 14. As shown by FIG. 1, the diaphragm 16 has a rib 18 at its periphery that is thicker than the inner portion of the diaphragm 16. The rib 18 is captured within the recess 72 by the flange mating surface 42 of the flange 22. An inner portion of the diaphragm 16 that is thinner than the rib 18 is captured between the flange mating surface 42 and the upper surface 80. The rib is prevented from moving inwardly away from the second mating surface 52 by the inner recess wall 78. As is evident from FIG. 1, the rib 18 conforms to the flange mating surface 42 and the lower surface 76 to provide a seal that prevents fluid or gas within the regulator 10 from leaking between the flange 22 and the body 14.

As best shown by FIGS. 6 and 7, the engaging surface 46 is oriented and configured to engage the lip 32 to provide a strengthened crimp joint and to limit the deformation of the lip 32 to form the joint. The engaging surface 46 includes a bead 82 adjacent to the edge 44 and a surface 84 that meets the bead 82 opposite the edge 44 and extends from the bead 82 away from the edge 44.

The surface 84 is oriented to extend away from the edge 44 and along the inner surface 64 of the lip 32 and away from the second mating surface 52. As best shown by FIG. 6, because the surface 84 extends away from the second mating surface 52, the deformation required to bring the lip 32 into engaging contact with the engaging surface 46 of the flange 22 is measured by an angle A between the surface 84 and the inner surface 64. As presently preferred, the angle A is approximately seventy degrees.

The bead 82 extends from the flange 22 in a direction away from the surface 84 and inwardly away from the flange edge 44. The bead 82 is sized to deform and to engage and deform the lip 32 when that lip 32 is deformed to overlie the flange engaging surface 46 to form the crimp joint 20. As best shown by FIG. 7, the lip 32 is deformed from its original configuration extending beyond the flange 22 to overlie and conform to the engaging surface 46 to form the crimp joint 20. The lip 32 may be deformed by any conventional means, including bending, roll forming, and orbital riveting. Deforming by roller wheels is presently preferred for forming the crimp joint 20 of the described embodiment.

The bead 82 is sized based on the ductility of the material from which the lip 32 is formed and the thickness of the lip 32 from the inner surface 64 to the outer surface 68. The height of the lip 32 of the described embodiments from the second mating surface 52 to the edge 66 is 0.205 inches. The thickness of the lip 32 of the described embodiments from the outer surface 68 to the inner surface 64 is approximately 0.078 inches adjacent to the second mating surface 52 and is approximately 0.037 inches at the edge 66. The thickness of the flange 22 at the flange edge 44, from the second mating surface 52 to the farthest extend of the bead 82, is approximately 0.137 inches.

When the regulator 10 having the crimp joint 20 is subjected to a pressure within the body and bonnet, that pressure tends to force the bonnet 12 away from the body 14 and to therefor open the crimp joint 20. That internal pressure causes the flange 22 to push against the lip 32 to urge the lip 32 to approach its original configuration shown by FIG. 6 from the deformed configuration shown by FIG. 7. The bead 82 is sized and located to engage, or grip the lip 32 near the flange edge 44, as shown by FIG. 7, to resist movement of the flange 22 away from the second mating surface 52.

The dimensions of the bead 82 of the engaging surface 46 determine its effectiveness in increasing the strength of the crimp joint 20. The bead 82 is sized to have a width W that is sufficiently large to prevent a shearing of the bead 82 from the flange 22 when the joint 20 is subjected to load due to pressure within the bonnet 12 and the body 14. The width W of the bead 82 must be sufficiently narrow to cause the lip 32 to form around the bead 82 as the lip 32 is deformed to overlie the engaging surface 46. As presently preferred for the described embodiment, W is within the range of 0.022–0.030 inches. The height H of the bead 82 must be sufficient to assure that the bead will not be deformed to an ineffective height when the wall 32 is deformed to overlie the engaging surface 46. The height H of the bead 82 must also not be so large that it will weaken the wall 32 by causing an unacceptably large deformation of the lip 32 when the lip 32 is deformed to overlie the engaging surface 46 and to engage the bead 82. As presently preferred for the described embodiment, H is within the range of 0.007–0.012 inches.

The effectiveness of the bead 82 to increase the strength of the crimp joint 20 of the described embodiment has been evaluated by measuring the amount of pressure within the bonnet 12 and the body 14 that is required to cause the lip 32 to deform to allow the flange 22 to separate from the second mating surface 52. That pressure was measured for the flange 22 having the described bead 82, and for a smooth flange having not bead, that is the surface 84 extends uninterrupted to the flange edge 44. The pressure required to separate the flange 22 having the bead 82 from the second mating surface 52 was found to be at least 150 percent of the pressure required to separate a flange not having the bead 82 from the second mating surface 52.

The present invention has been described by reference to preferred embodiments of the invention. Those skilled in the art will recognize that changes may be made without departing from the scope of the invention.

What is claimed is:

1. A crimp joint formed by a first component and a second component comprising:
   a flange formed by the first component, the flange defining
      a flange mating surface facing outwardly from the first component,
      a flange edge extending at least in part perpendicularly away from the flange mating surface, and
      a flange engaging surface extending from the flange edge over the flange mating surface, the flange engaging surface including a bead that is near the flange edge and that protrudes a bead height outwardly from the flange engaging surface adjacent to the bead, the bead extending generally along at least a portion of the flange edge;
   a second mating surface defined by the second component, the second mating surface
      facing outwardly from the second component and configured to conform to at least a part of the flange mating surface;
   a lip formed by the second component
      located adjacent to the second mating surface,
      extending along the second mating surface and configured to closely surround at least a portion of the flange edge, and
      extending a distance from the second mating surface that is greater than the distance between the flange mating surface and the flange engaging surface at the flange edge;
   the flange mating surface positioned adjacent to the second mating surface;
   the lip extending along the flange edge to the flange engaging surface and from the flange edge over the flange engaging surface a distance from the flange edge beyond the bead;
   the lip having a thickness overlying the bead that is greater than the bead height; and
   the lip at least substantially conforming to the bead along a direction away from the flange edge.

2. The crimp joint of claim 1 wherein the second component is made of a low ductility metal.

3. A crimp joint according to claim 1 wherein the flange engaging surface that extends from the flange edge over the flange mating surface includes an inner surface adjacent to the bead and opposite the flange edge, the inner surface extending in part away from the flange mating surface as it extends away from the flange edge.

4. A crimp joint according to claim 1 wherein the lip contacts the flange engaging surface adjacent to the bead and opposite the flange edge.

5. A crimp joint according to claim 1 wherein the bead height is less than two thirds the thickness of the lip overlying the bead.

6. A crimp joint according to claim 1 wherein the bead height is less than one third the thickness of the lip overlying the bead.

* * * * *